(12) United States Patent
Yoshizawa

(10) Patent No.: US 6,905,262 B2
(45) Date of Patent: Jun. 14, 2005

(54) SEMICONDUCTOR DEVICE FOR OPTICALLY COUPLING SEMICONDUCTOR LIGHT-EMITTING DEVICE TO OPTICAL FIBER

(75) Inventor: Tetsu Yoshizawa, Kawasaki (JP)

(73) Assignee: NEC Compound Semiconductor Devices, Ltd. (JP)

( * ) Notice: Subject to any disclaimer, the term of this patent is extended or adjusted under 35 U.S.C. 154(b) by 197 days.

(21) Appl. No.: 10/253,752

(22) Filed: Sep. 24, 2002

(65) Prior Publication Data

US 2003/0072543 A1 Apr. 17, 2003

(30) Foreign Application Priority Data

Sep. 26, 2001 (JP) .................................. 2001-294608

(51) Int. Cl.[7] .............................................. G02B 6/36
(52) U.S. Cl. ............................ 385/93; 385/49; 385/94
(58) Field of Search ............................ 385/49, 88, 89, 385/92–94

(56) References Cited

U.S. PATENT DOCUMENTS

| | | | | |
|---|---|---|---|---|
| 4,726,645 A | * | 2/1988 | Yamashita et al. | ............ 385/35 |
| 4,915,470 A | * | 4/1990 | Moore et al. | ................. 385/94 |
| 5,307,435 A | * | 4/1994 | Chihara | ........................ 385/92 |
| 6,123,465 A | | 9/2000 | Hashizume | .................. 385/93 |
| 6,157,012 A | * | 12/2000 | Tanaka et al. | .............. 219/633 |
| 6,283,644 B1 | * | 9/2001 | Gilliland et al. | .............. 385/93 |
| 6,758,611 B1 | * | 7/2004 | Levin et al. | .................. 385/93 |

FOREIGN PATENT DOCUMENTS

| | | | | |
|---|---|---|---|---|
| EP | 0 690 323 | 1/1996 | ............ | G02B/6/42 |
| JP | 59-166906 | 9/1984 | ............ | G02B/7/26 |
| JP | 63122181 | 5/1988 | ........... | H01L/31/12 |
| JP | 3-061927 | 9/1991 | ............ | G02B/6/42 |
| JP | 04034404 | 2/1992 | ............ | G02B/6/42 |
| JP | 07218773 | 8/1995 | ............ | G02B/6/42 |
| JP | 07-218773 | 8/1995 | ............ | G02B/6/42 |
| JP | 7-218773 | 8/1995 | ............ | G02B/6/42 |

* cited by examiner

Primary Examiner—David V. Bruce
Assistant Examiner—Thomas R Artman
(74) Attorney, Agent, or Firm—Hayes Soloway P.C.

(57) ABSTRACT

A semiconductor device for optically coupling a semiconductor light-emitting device to an optical fiber, includes (a) a lens which focuses lights emitted from the semiconductor light-emitting device, onto the optical fiber, (b) a shell which supports the lens therewith, the shell being comprised of a cylindrical first portion, a second portion integral with the first portion at an upper end of the first portion and being formed centrally with an opening into which the lens is to be fit, and a cylindrical third portion extending from the first portion upwardly beyond the second portion, (c) glass arranged around the lens for keeping the lens and the opening hermetically sealed, and (d) a reinforcement formed on at least one of upper and lower surfaces of the second portion for preventing the shell from being deformed due to a stress acting on the shell.

22 Claims, 8 Drawing Sheets

SEMICONDUCTOR DEVICE FOR OPTICALLY COUPLING SEMICONDUCTOR LIGHT-EMITTING DEVICE TO OPTICAL FIBER

BACKGROUND OF THE INVENTION

1. Field of the Invention

The invention relates to a semiconductor device for optically coupling a semiconductor light-emitting device to an optical fiber.

2. Description of the Related Art

A lot of semiconductor devices for optically coupling a semiconductor light-emitting device to an optical fiber have been suggested. For instance, such semiconductor devices are suggested in Japanese Patent Publication No. 3-61927 (B2) (Japanese Unexamined Patent Publication No. 59-166906 (A)) and Japanese Unexamined Patent Publication No. 7-218773 (A).

Hereinbelow is explained a semiconductor device for optically coupling a semiconductor light-emitting device to an optical fiber, suggested in Japanese Patent Publication No. 3-61927, as an example.

FIG. 1 is a cross-sectional view of a semiconductor laser module including such a semiconductor device, disclosed in Japanese Patent Publication No. 3-61927, as an example.

The semiconductor device for optically coupling a semiconductor light-emitting device to an optical fiber is comprised of a spherical-lens holder 63 fixedly mounted on a stem 62 on which a heat sink 60 to which a semiconductor laser device 61 is fixed is mounted, a spherical lens 64 fit into a hole formed centrally with the spherical-lens holder 63 such that a center of the spherical lens 64 is on an extension of an optical axis of the semiconductor laser device 61, and wax 65 coated in a belt around the spherical-lens holder 63 to keep inside of the spherical-lens holder 63 in air-tight condition.

The spherical-lens holder 63 is comprised of a first portion 63 formed cylindrical, and a second portion 63a formed annular, formed integral with the first portion 63a at an upper end of the first portion 63a, and formed centrally with a hole into which the spherical lens 64 is fit.

The semiconductor device for optically coupling a semiconductor light-emitting device to an optical fiber cooperates with other parts to thereby define a semiconductor laser module. Positional relations between the semiconductor device and other parts are as follows.

On a base 66 on which the stem 62 is mounted is slidably mounted a ferrule holder 67 which surrounds the spherical-lens holder 63 therein. The ferrule holder 67 is formed with a projecting tube 67a into which a ferrule 69 to which an optical fiber 68 is physically connected is inserted.

The ferrule holder 67 is adjusted in position in a direction A perpendicular to an optical axis with the ferrule holder 67 being mounted on the base 66, and further, the ferrule 69 is slid in the projecting tube 67a in a direction B of an optical axis such that laser beams emitted from the semiconductor laser device 61 through the spherical lens 64 are focused on an end surface 68a of the optical fiber 68.

After optimizing an optical positional relation between the semiconductor laser device 61 and the optical fiber 68 through the spherical lens 64 in the above-mentioned manner, the ferrule holder 67 is fixed on the base 66 by resistance welding. In addition, the ferrule 69 is fixed to the ferrule holder 67 by adhesive 70.

Though the spherical lens 64 is supported on the spherical-lens holder 63 through the wax 65 in the conventional semiconductor device for optically coupling a semiconductor light-emitting device to an optical fiber, illustrated in FIG. 1, the spherical lens 64 is generally supported on the spherical-lens holder 63 through glass having a low fusing point, in order to more certainly keep the spherical lens 64 and the spherical-lens holder 63 hermetically sealed therebetween.

In general, the spherical-lens holder 63 is fixed to the stem by resistance welding. In such resistance welding, a temperature of about 1,400 degrees centigrade is applied instantaneously to the spherical-lens holder 63. Hence, a lower portion of the first portion 63a of the spherical-lens holder 63 is heated to a temperature of about 1,400 degrees centigrade, but since a temperature of about 1,400 degrees centigrade is applied to the spherical-lens holder 63 for quite a short period of time, an upper portion of the first portion 63a, for instance, a portion at which the first portion 63a and the second portion 63b are connected to each other is heated only to about 30 to 40 degrees centigrade.

Accordingly, the first portion 63a expands to a greater degree at a lower portion thereof than at an upper portion thereof. As a result of different degrees of expansion between the upper and lower portions of the first portion 63a, there is generated a thermal stress in the spherical-lens holder 63. As illustrated in FIG. 2, the thermal stress acts on the spherical-lens holder 63 as a compressive stress T directing towards a center from an outer edge of the spherical-lens holder 63.

The compressive stress T causes elastic deformation in the spherical-lens holder 63, as shown in FIG. 2 with a broken line 63c.

In the semiconductor device illustrated in FIG. 1, an interface between the spherical lens 64 and the spherical-lens holder 63, in other words, the wax 65 or the glass has the smallest resistance to a stress among parts constituting the semiconductor device. Accordingly, when the spherical-lens holder 63 is elastically deformed as shown in FIG. 2 with the broken line 63c, a stress caused by the elastic deformation acts on the wax 65 or the glass most.

As a result, the wax 65 or the glass is cracked. If the crack reaches both inner and outer surfaces of the spherical-lens holder 63, there is generated a leakage path through which air enters from outside into inside of the spherical-lens holder 63. Thus, it is no longer possible to keep the spherical lens 64 and the spherical-lens holder 63 hermetically sealed therebetween, resulting in reduction in a light-emitting efficiency of the semiconductor laser device 61.

SUMMARY OF THE INVENTION

In view of the above-mentioned problems in the conventional semiconductor device, it is an object of the present invention to provide a spherical-lens holder which is capable of preventing the wax 65 or the glass through which the spherical lens 64 and the spherical-lens holder 63 are hermetically sealed therebetween, from being cracked due to a thermal stress which is caused by heat generated when the spherical-lens holder 63 is fixed on the stem 62 by resistance welding.

In one aspect of the present invention, there is provided a semiconductor device for optically coupling a semiconductor light-emitting device to an optical fiber, including (a) a lens which focuses lights emitted from the semiconductor light-emitting device, onto the optical fiber, (b) a shell which supports the lens therewith, the shell being comprised of a cylindrical first portion, a second portion integral with the first portion at an upper end of the first portion and being formed centrally with an opening into which the lens is to be fit, and a cylindrical third portion extending from the first portion upwardly beyond the second portion, (c) glass arranged around the lens for keeping the lens and the opening hermetically sealed, and (d) a reinforcement formed on at least one of upper and lower surfaces of the second portion for preventing the shell from being deformed due to a stress acting on the shell.

The inventor has found out that it was possible to a high degree to prevent a shell, which corresponds the spherical-lens holder 63 in the conventional semiconductor device illustrated in FIG. 1, from being elastically deformed due to a thermal stress caused by heat which was generated when the shell is fixed on a stem by resistance welding, by designing the shell to have a shape taking a thermal stress into consideration. Specifically, it is possible to increase a strength of the shell against a stress by providing a reinforcement on an upper or lower surface or on upper and lower surfaces of the second portion of the shell, and hence, it is possible to prevent the shell from being elastically deformed to a high degree. Accordingly, it is possible to prevent the glass from being cracked.

When the reinforcement is provided on an upper surface of the second portion of the shell, it is preferable to form the reinforcement integral with the third portion formed as an extension of the first portion, ensuring a further increased strength of the shell and further preventing the glass from being cracked.

It is preferable to design the reinforcement to have a shape for covering a stress acting on the second portion therewith when thermal stress acts on the shell.

By designing the reinforcement to entirely cover therewith a stress acting on the second portion, it would be possible to cancel a stress acting on the shell, with the reinforcement having a minimum area.

The reinforcement may be designed to have various shapes.

For instance, the reinforcement may be designed to have a linearly tapered cross-section. As an alternative, the reinforcement may be designed to have a step-shaped cross-section. As an alternative, the reinforcement may be designed to have an inwardly-projecting arcuate cross-section.

There is further provided a semiconductor device for optically coupling a semiconductor light-emitting device to an optical fiber, including (a) a lens which focuses lights emitted from the semiconductor light-emitting device, onto the optical fiber, (b) a shell which supports the lens therewith, the shell being comprised of a cylindrical first portion, and a second portion integral with the first portion at an upper end of the first portion and being formed centrally with an opening into which the lens is to be fit, (c) glass arranged around the lens for keeping the lens and the opening hermetically sealed, and (d) a reinforcement formed on a lower surface of the second portion for preventing the shell from being deformed due to a stress acting on the shell.

In comparison with the firstly mentioned semiconductor device, it is not necessary for the shell to have the third portion, when the reinforcement is formed only on a lower surface of the second portion of the shell.

There is further provided a semiconductor device for optically coupling a semiconductor light-emitting device to an optical fiber, including (a) a lens which focuses lights emitted from the semiconductor light-emitting device, onto the optical fiber, (b) a shell which supports the lens therewith, the shell being comprised of a cylindrical first portion, and a second portion integral with the first portion at an upper end of the first portion and being formed centrally with an opening into which the lens is to be fit, and (c) glass arranged around the lens for keeping the lens and the opening hermetically sealed, the second portion of the shell having a stress-concentration portion which has a thickness smaller than a thickness of the rest of the second portion and to which, when a stress acts on the shell, the stress is concentrated.

In the above-mentioned semiconductor device, the shell is designed to have a stress-concentration portion in the second portion which stress-concentration portion has a thickness smaller than a thickness of the rest of the second portion. Since the stress-concentration portion has a strength smaller than a strength of the rest of the second portion, when the shell is elastically deformed due to a thermal stress, a stress caused by the elastic deformation of the shell is concentrated to and absorbed into the stress-concentration portion. Accordingly, it is possible to prevent a stress caused by the elastic deformation of the shell from acting on the glass defining an interface between the lens and the shell, and further prevent the glass from being cracked.

The stress-concentration portion may be formed in various manners.

For instance, the stress-concentration portion may be defined by one or more recess(es) extending from at least one of upper and lower surfaces of the second portion.

It is preferable that the shell has a cylindrical third portion extending from the first portion upwardly beyond the second portion, even if the second portion is designed to have the above-mentioned stress-concentration portion.

In another aspect of the present invention, there is provided a shell for supporting a lens which focuses lights emitted from a semiconductor light-emitting device, onto an optical fiber, the shell being comprised of a cylindrical first portion, a second portion integral with the first portion at an upper end of the first portion and being formed centrally with an opening into which the lens is to be fit, and a cylindrical third portion extending from the first portion upwardly beyond the second portion, the shell including a reinforcement formed on at least one of upper and lower surfaces of the second portion for preventing the shell from being deformed due to a stress acting on the shell.

It is preferable that the reinforcement has a shape for covering a stress acting on the second portion therewith when thermal stress acts on the shell.

For instance, the reinforcement may be designed to have a linearly tapered cross-section, a step-shaped cross-section or an inwardly-projecting arcuate cross-section.

There is further provided a shell for supporting a lens which focuses lights emitted from a semiconductor light-emitting device, onto an optical fiber, the shell being comprised of a cylindrical first portion, and a second portion integral with the first portion at an upper end of the first portion and being formed centrally with an opening into which the lens is to be fit, the shell including a reinforcement formed on a lower surface of the second portion for preventing the shell from being deformed due to a stress acting on the shell.

There is still further provided a shell for supporting a lens which focuses lights emitted from a semiconductor light-emitting device, onto an optical fiber, the shell being comprised of a cylindrical first portion, and a second portion integral with the first portion at an upper end of the first portion and being formed centrally with an opening into which the lens is to be fit, the second portion of the shell having a stress-concentration portion which has a thickness smaller than a thickness of the rest of the second portion and to which, when a stress acts on the shell, the stress is concentrated.

The stress-concentration portion may be defined by at least one recess extending from at least one of upper and lower surfaces of the second portion.

The shell may be defined to have a cylindrical third portion extending from the first portion upwardly beyond the second portion.

The above-mentioned semiconductor devices may be applied to a semiconductor laser module.

The advantages obtained by the aforementioned present invention will be described hereinbelow.

In accordance with the present invention, the reinforcement formed on an upper or lower surface or upper and lower surfaces of the second portion compensate for a stress acting on the second portion when the shell is elastically deformed. Accordingly, it is possible to prevent a shell from being elastically deformed to a high degree, when the shell is fixed on a stem by resistance welding. Hence, it is possible to prevent the glass from being cracked due to the elastic deformation of the shell.

When the reinforcement is provided on an upper surface of the second portion of the shell, it is preferable to form the reinforcement integral with the third portion formed as an extension of the first portion, ensuring an increased strength of the reinforcement and further preventing the glass from being cracked.

In addition, in accordance with the present invention, it is possible to significantly enlarge a range of a current necessary for fixing the shell to a stem by resistance welding, in comparison with the conventional semiconductor device illustrated in FIG. 1.

By designing the shell to have a stress-concentration portion in the second portion which stress-concentration portion has a thickness smaller than a thickness of the rest of the second portion, when the shell is elastically deformed due to a thermal stress, a stress caused by the elastic deformation of the shell is concentrated to and absorbed into the stress-concentration portion. As a result, it is possible to prevent a stress caused by the elastic deformation of the shell from acting on the glass defining an interface between the lens and the shell, and hence, it is also possible to prevent the glass from being cracked.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
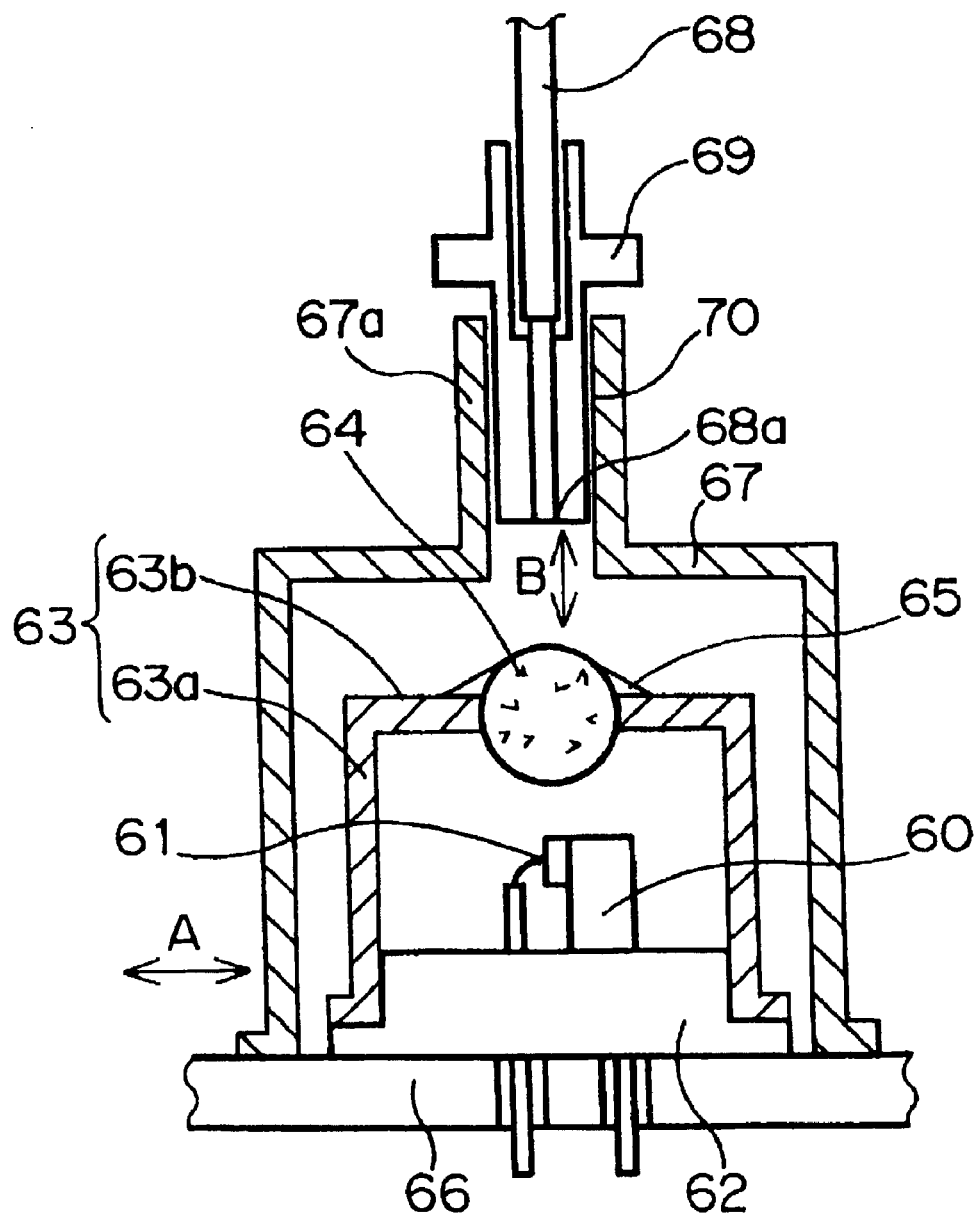
FIG. 1 is a longitudinal cross-sectional view of a semiconductor laser module including a conventional semiconductor device for optically coupling a semiconductor light-emitting device to an optical fiber.
Figure 2:
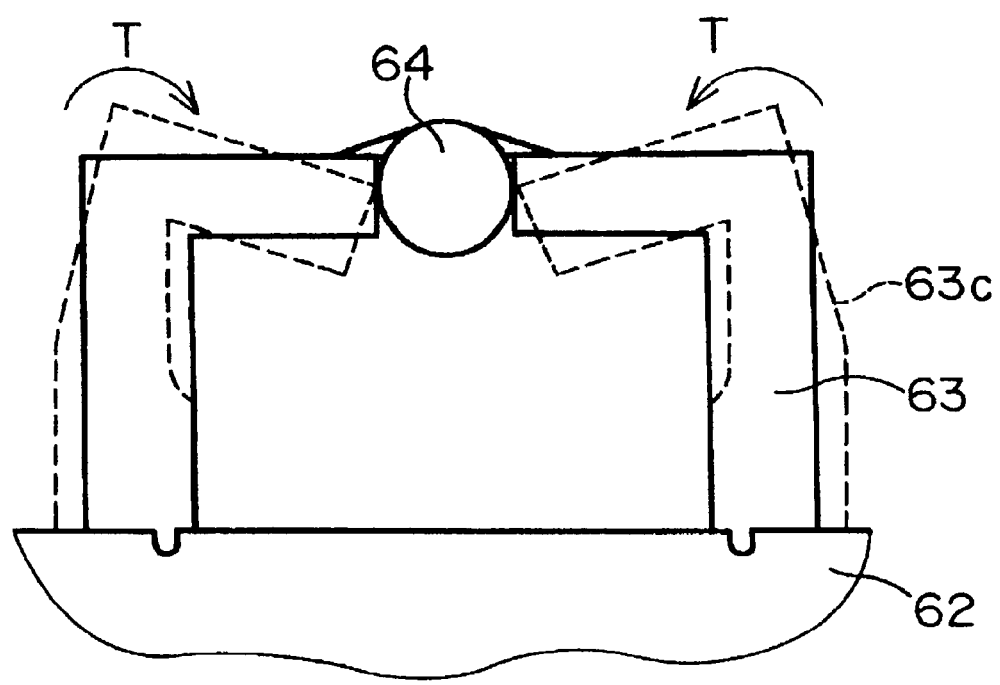
FIG. 2 illustrates the elastic deformation of the spherical-lens holder in the semiconductor device illustrated in FIG. 1.

The semiconductor devices for optically coupling a semiconductor light-emitting device to an optical fiber, in accordance with the embodiments should be replaced with the conventional semiconductor device illustrated in FIG. 1. A semiconductor laser module to which the semiconductor devices in accordance with the embodiments of the present invention are applied has the same structure as the structure of the semiconductor laser module illustrated in FIG. 1 except the semiconductor device for optically coupling a semiconductor light-emitting device to an optical fiber.

Figure 3:
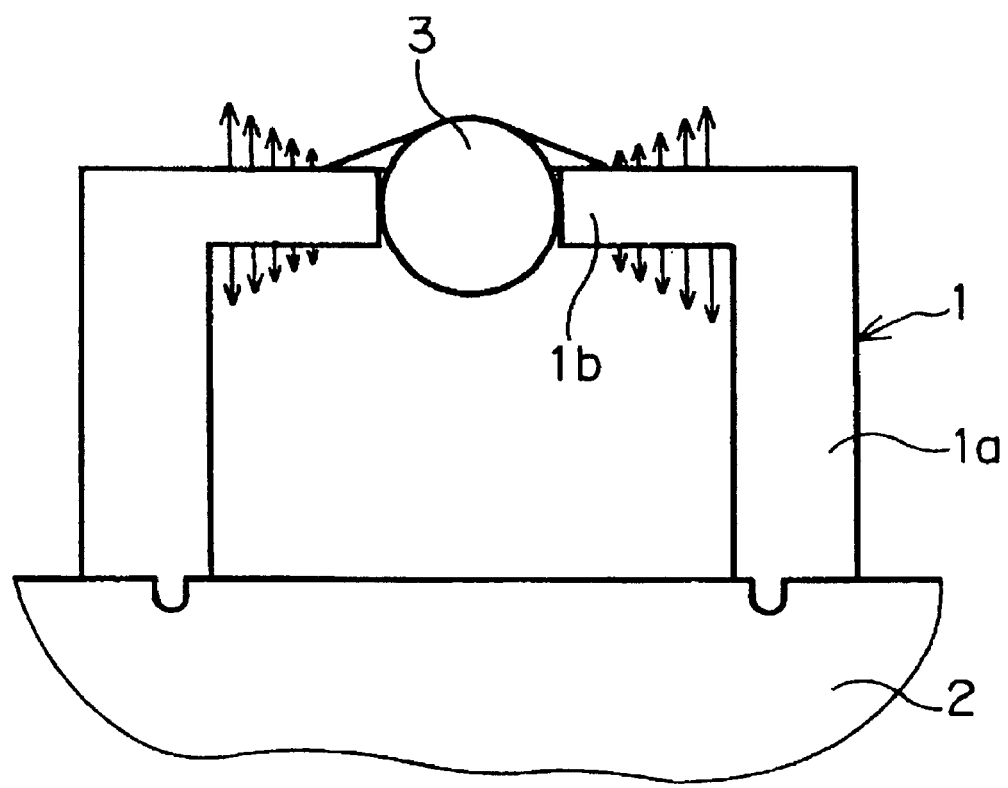
FIG. 3 illustrates distribution of a stress acting on a shell.

FIG. 3 illustrates a profile of a stress acting on a first portion 1b of a shell 1, which corresponds to the spherical-lens holder 63 illustrated in FIG. 1, which stress is generated when the shell 1 is elastically deformed due to heat generated when the shell 1 is fixed to a stem by resistance welding.

The inventor analyzed a stress acting on the shell 1 when the shell 1 was elastically deformed. As a result of the analysis, it was found out that a stress acting on a second portion 1b of the shell 1 had such a linear tapered profile that it was greater at a position closer to the first portion 1a, and smaller at a position closer to a spherical lens 3, as illustrated in FIG. 3.

Consequently, it was also found out that a reinforcement to be formed on the second portion 1b of the shell 1 had to have such a shape as partially or entirely covering a stress acting on the second portion 1b.

In view of the above-mentioned analysis, the semiconductor devices for optically coupling a semiconductor light-emitting device to an optical fiber, in accordance with the first to fourth embodiments, are explained hereinbelow.

[First Embodiment]

Figure 4:
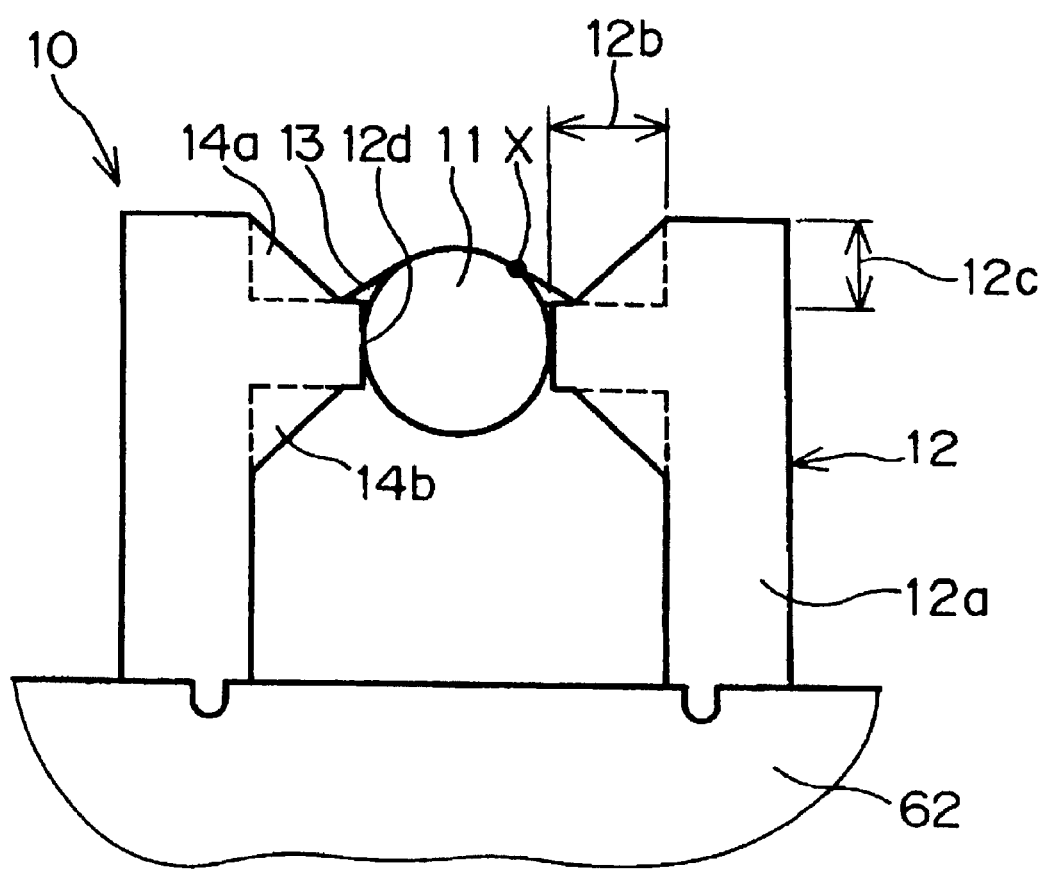
FIG. 4 is a longitudinal cross-sectional view of a semiconductor device for optically coupling a semiconductor light-emitting device to an optical fiber, in accordance with the first embodiment of the present invention.

FIG. 4 is a longitudinal cross-sectional view of a semiconductor device 10 for optically coupling a semiconductor light-emitting device to an optical fiber, in accordance with the first embodiment of the present invention.

The semiconductor device 10 is comprised of a lens 11 which focuses lights emitted from a semiconductor light-emitting device, onto an optical fiber, a shell 12 which supports the lens 11 therewith, and a glass 13 arranged around the lens 11 for keeping the lens 11 and a later-mentioned opening 12d hermetically sealed to each other. The glass 13 is a glass having a low fusing point.

The shell 12 is composed of 50 Fe/Ni, and is comprised of a cylindrical first portion 12a, an annular second portion 12b inwardly integral with the first portion 12a at an upper end of the first portion 12a and formed centrally with an opening 12d into which the lens 11 is to be fit, and a cylindrical third portion 12c extending from the first portion 12a upwardly beyond the second portion 12b.

The semiconductor device 10 is comprised further of first and second reinforcements 14a and 14b formed on upper and lower surfaces of the second portion 12b of the shell, respectively.

The first and second reinforcements 14a and 14b are annular, and have a linear cross-section which is tapered to the second portion 12b. In other words, a right-angled triangular cross-section in which two sides sandwiching a right angle therebetween make contact with the second and third portions 12b and 12c.

The first and second reinforcements 14a and 14b are designed to have dimensions for entirely covering therewith a stress acting on the second portion 12b.

In accordance with the semiconductor device 10, since a stress acting on the second portion 12b when the shell 12 is elastically deformed is completely compensated for by the first and second reinforcements 14a and 14b formed on upper and lower surfaces of the second portion 12b, it is possible to prevent the shell 12 to a high degree from being elastically deformed when the shell 12 is fixed on the stem 62 by resistance welding. Accordingly, it is now possible to prevent the glass 13 from being cracked due to the elastic deformation of the shell 12.

As mentioned above, the semiconductor device 10 is designed to include the third portion 12c formed as an extension of the first portion 12a upwardly beyond the second portion 12b. By forming the first reinforcement 14a integral with the third portion 12c, it would be possible to significantly enhance a strength of the first reinforcement 14a, and hence, possible to further certainly prevent the glass 13 from being cracked.

In addition, in accordance with the semiconductor device 10, it is possible to enlarge a range of a current necessary for fixing the shell 12 to the stem 62 by resistance welding, in comparison with the conventional semiconductor device illustrated in FIG. 1.

In accordance with the measurement having been conducted by the inventor, a current at which the spherical-lens holder 63 was fixed to the stem 62 by resistance welding in the conventional semiconductor device illustrated in FIG. 1 was in the range of 4.1 to 4.3 kA, whereas the same in the semiconductor device 10 in accordance with the first embodiment was in the range of 3.5 to 5.0 kA. Thus, the semiconductor device 10 can increase a range of a current at which the shell 12 is fixed to the stem 62 by resistance welding, up to 1.5 kA (5.0–3.5 kA) from 0.2 kA (4.3–4.1 kA).

In the semiconductor device 10 in accordance with the first embodiment, a spherical lens is used as the lens 11, but a shape of the lens 11 is not to be limited to a sphere. For instance, a non-spherical lens may be used as the lens 11. Any lens may be used as the lens 11 in the semiconductor device 10, if it has at least partially a circular arc in its surface.

In the semiconductor device 10 in accordance with the first embodiment, though the first and second reinforcements 14a and 14b are both formed on the upper and lower surfaces of the second portion 12b, it is not always necessary to form both the first and second reinforcements 14a and 14b on the second portion 12b. One of the first and second reinforcements 14a and 14b may be formed on the second portion 12b, in which case, the shell 12 would have an enhanced strength to a smaller degree than a case in which both the first and second reinforcements 14a and 14b are formed on the upper and lower surfaces of the second portion 12b, but the shell 12 could have a strength sufficient to prevent the elastic deformation of the shell 12.

In order to confirm the advantageous effects brought by the semiconductor device 10 in accordance with the first embodiment, the inventor had measured a stress at a point X in FIG. 4, that is, an uppermost point in an interface between the lens 11 and the glass 13, as a typical stress caused by the elastic deformation of the shell 12.

In the conventional semiconductor device illustrated in FIG. 1, a compressive stress of 30.6 MPa was measured at the point X.

In the semiconductor device 10 in accordance with the first embodiment, a compressive stress of 20.9 MPa was measured at the point X.

Thus, the semiconductor device 10 can reduce a compressive stress by 31.7% relative to a compressive stress of 30.6 MPa in the conventional semiconductor device.

In the semiconductor device 10 designed to include only the first reinforcement 14a on the upper surface of the second portion 12b, a compressive stress of 21.4 MPa was measured at the point X.

Thus, even if the semiconductor device 10 is designed not to include the second reinforcement 14b, that is, designed to include on the first reinforcement 14a, the semiconductor device 10 can reduce a compressive stress by 30.1% relative to a compressive stress of 30.6 MPa in the conventional semiconductor device.

The above-mentioned measurement shows that the semiconductor device 10 in accordance with the first embodiment can effectively reduce a stress by which the glass 13 will be cracked.

[Second Embodiment]

Figure 5:
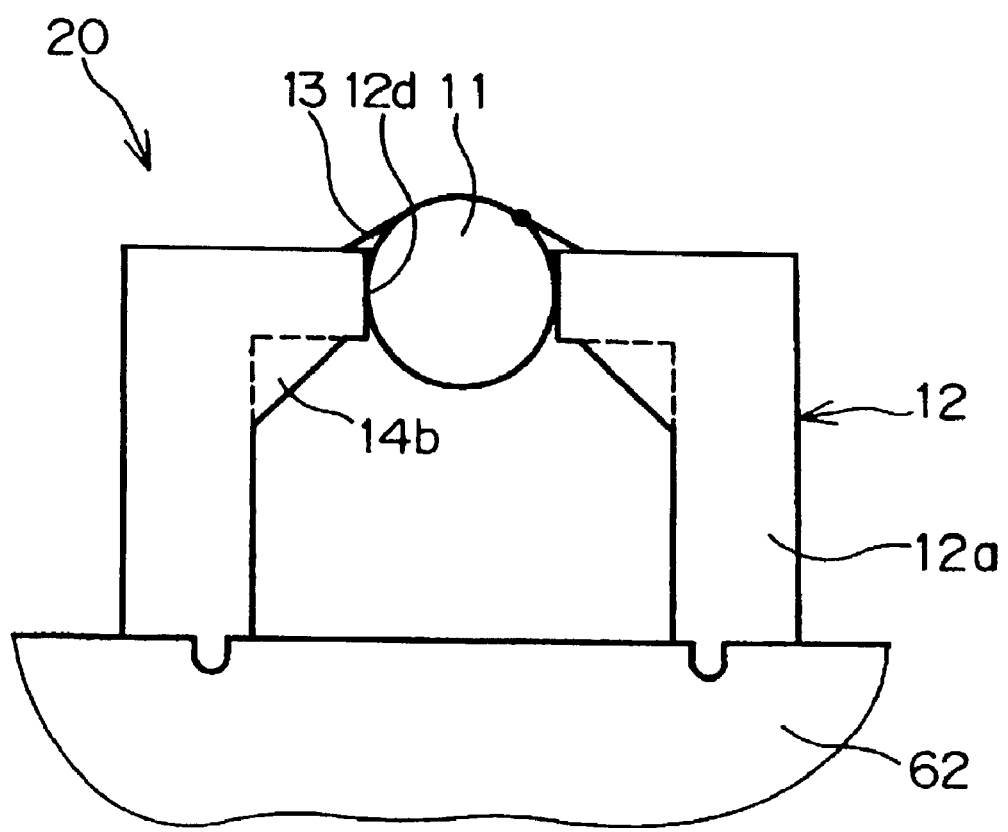
FIG. 5 is a longitudinal cross-sectional view of a semiconductor device for optically coupling a semiconductor light-emitting device to an optical fiber, in accordance with the second embodiment of the present invention.

FIG. 5 is a longitudinal cross-sectional view of a semiconductor device 20 for optically coupling a semiconductor light-emitting device to an optical fiber, in accordance with the second embodiment of the present invention.

The shell 12 in the second embodiment is comprised of the first portion 12a, the second portion 12b and the second reinforcement 14b formed on the lower surface of the second portion 12b. That is, the shell 12 in the second embodiment is designed not to have the first reinforcement 14a and the third portion 12c in comparison with the semiconductor device 10 in accordance with the first embodiment, illustrated in FIG. 3.

When the first reinforcement 14a is not formed on the upper surface of the second portion 12b of the shell 12, it is not necessary to design the shell 12 to have the third portion 12c.

In accordance with the semiconductor device 20, since a stress acting on the lower surface of the second portion 12b when the shell 12 is elastically deformed is compensated for by the second reinforcement 14b formed on the lower surface of the second portion 12b, it is possible to prevent the shell 12 from being elastically deformed when the shell 12 is fixed on the stem 62 by resistance welding, though to a smaller degree than the semiconductor device 10 in accordance with the first embodiment. Accordingly, it is possible to prevent the glass 13 from being cracked due to the elastic deformation of the shell 12.

[Third Embodiment]

Figure 6:
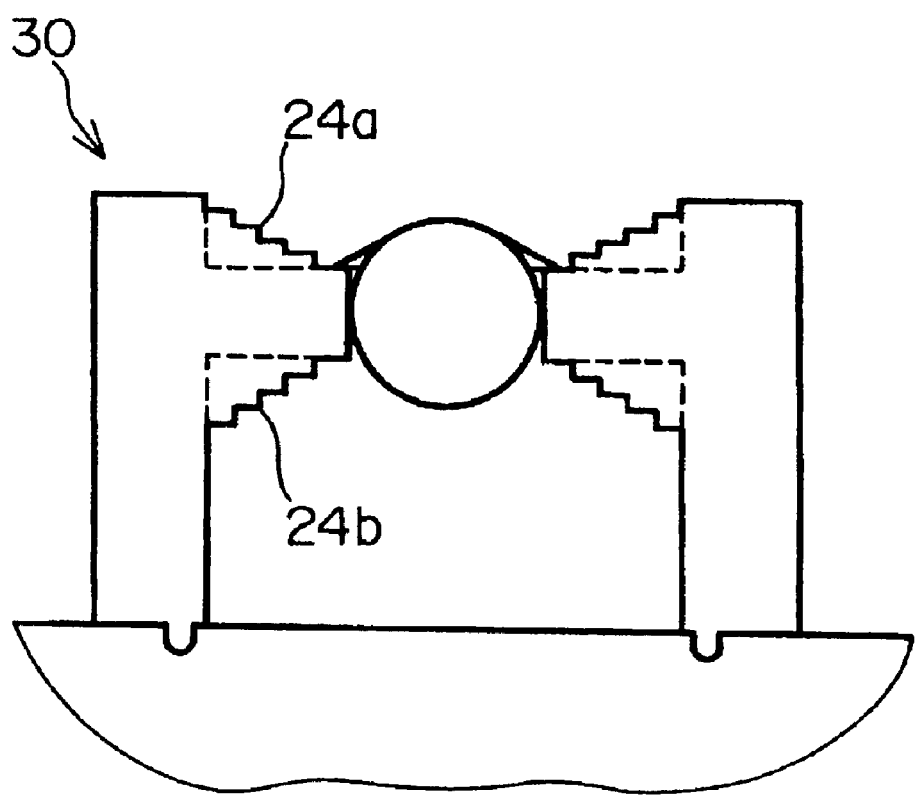
FIG. 6 is a longitudinal cross-sectional view of a semiconductor device for optically coupling a semiconductor light-emitting device to an optical fiber, in accordance with the third embodiment of the present invention.

FIG. 6 is a longitudinal cross-sectional view of a semiconductor device 30 for optically coupling a semiconductor light-emitting device to an optical fiber, in accordance with the third embodiment of the present invention.

The semiconductor device 30 in accordance with the third embodiment is designed to include first and second step-shaped reinforcements 24a and 24b in place of the first and second reinforcements 14a and 14b in the first embodiment.

The first and second step-shaped reinforcements 24a and 24b are designed to have dimensions for entirely covering therewith a stress acting on the upper and lower surfaces of the second portion 12b. Accordingly, the semiconductor device 30 prevents the glass 13 from being cracked due to the elastic deformation of the shell 12, similarly to the semiconductor device 10 in accordance with the first embodiment.

Similarly to the semiconductor device 10 in accordance with the first embodiment, it is not always necessary to form both the first and second step-shaped reinforcements 24a and 24b on the second portion 12b. One of the first and second step-shaped reinforcements 24a and 24b may be formed on the second portion 12b.

[Fourth Embodiment]

Figure 7:
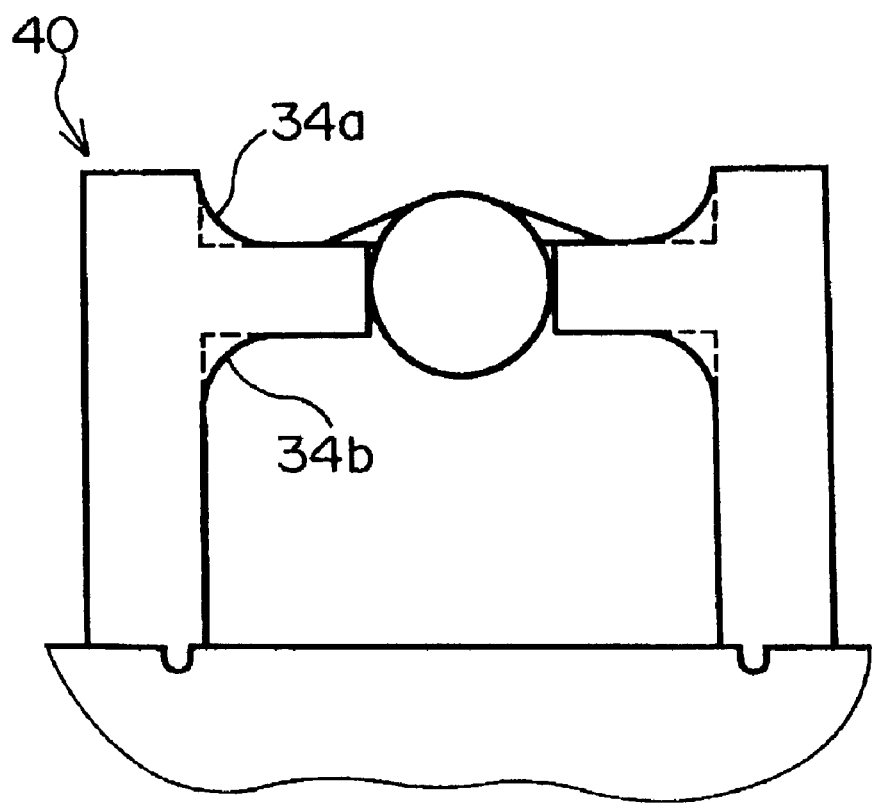
FIG. 7 is a longitudinal cross-sectional view of a semiconductor device for optically coupling a semiconductor light-emitting device to an optical fiber, in accordance with the fourth embodiment of the present invention.

FIG. 7 is a longitudinal cross-sectional view of a semiconductor device 40 for optically coupling a semiconductor light-emitting device to an optical fiber, in accordance with the fourth embodiment of the present invention.

The semiconductor device 40 in accordance with the fourth embodiment is designed to include first and second reinforcements 34a and 34b in place of the first and second reinforcements 14a and 14b in the first embodiment. As illustrated in FIG. 7, the first and second reinforcements 34a and 34b have such an arcuate cross-section that arc directs towards the first portion 12a.

Though the first and second arcuate reinforcements 34a and 34b are designed to have dimensions for partially covering therewith a stress acting on the upper and lower surfaces of the second portion 12b, the first and second arcuate reinforcements 34a and 34b covers almost all of the stress therewith. Accordingly, the semiconductor device 40 prevents the glass 13 from being cracked due to the elastic deformation of the shell 12, similarly to the semiconductor device 10 in accordance with the first embodiment.

Similarly to the semiconductor device 10 in accordance with the first embodiment, it is not always necessary to form both the first and second arcuate reinforcements 34a and 34b on the second portion 12b. One of the first and second arcuate reinforcements 34a and 34b may be formed on the second portion 12b.

[Fifth Embodiment]

Figure 8:
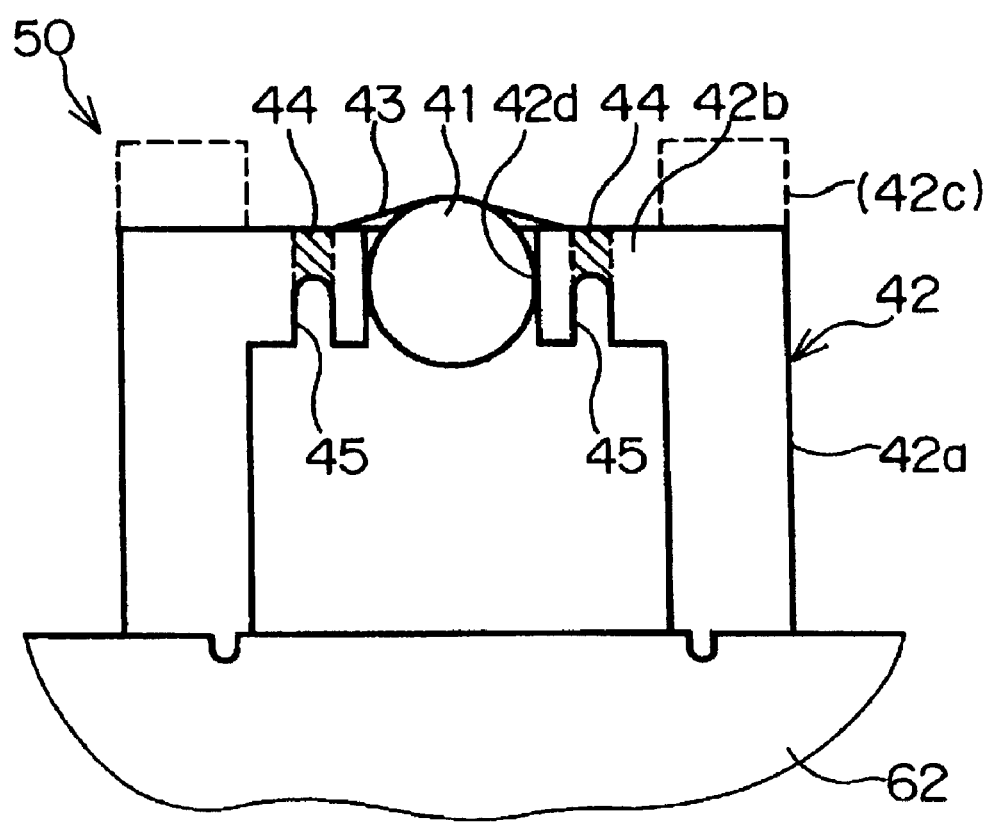
FIG. 8 is a longitudinal cross-sectional view of a semiconductor device for optically coupling a semiconductor light-emitting device to an optical fiber, in accordance with the fifth embodiment of the present invention.

FIG. 8 is a longitudinal cross-sectional view of a semiconductor device 50 for optically coupling a semiconductor light-emitting device to an optical fiber, in accordance with the fifth embodiment of the present invention.

The semiconductor device 50 is comprised of a lens 41 which focuses lights emitted from a semiconductor light-emitting device, onto an optical fiber, a shell 42 which supports the lens 41 therewith, and a glass 43 arranged around the lens 41 for keeping the lens 41 and a later-mentioned opening 42d hermetically sealed to each other. The glass 43 is a glass having a low fusing point.

The shell 42 is comprised of a cylindrical first portion 42a, and an annular second portion 42b inwardly integral with the first portion 42a at an upper end of the first portion 42a and formed centrally with an opening 42d into which the lens 41 is to be fit.

The second portion 42b of the shell 42 is designed to have a stress-concentration portion 44 (illustrated as a hatched portion in FIG. 8) which has a thickness smaller than a thickness of the rest of the second portion 42 and to which, when a stress acts on the shell 42, the stress is concentrated.

The stress-concentration portion 44 is defined by forming the second portion 42b of the shell 42 with a recess 45 extending from a lower surface of the second portion 42b.

Since the stress-concentration portion 44 has a smaller thickness than the rest of the second portion 42b, the stress-concentration portion 44 has a smaller strength than the rest of the second portion 42b. Accordingly, if the shell 42 is elastically deformed due to a thermal stress, almost all of a stress caused by the elastic deformation of the shell 42 is concentrated to and absorbed into the stress-concentration portion 44. As a result, it is possible to prevent the stress from being concentrated to the glass 43 through which the lens 41 and the shell 42 are connected to each other, and hence, it is also possible to prevent the glass 43 from being cracked.

In the semiconductor device 50 in accordance with the fifth embodiment, the recess 45 extends from a lower surface of the second portion 42b of the shell 42. It should be noted that the recess may be formed to extend from an upper surface of the second portion 42b, or that the recesses may be formed to extend from both upper and lower surfaces of the second portion 42b.

Though the semiconductor device 50 is designed to have one recess 45 for defining one stress-concentration portion 44, the semiconductor device 50 may be designed to have a plurality of recesses for defining a plurality of stress-concentration portions. When the semiconductor device 50 is designed to have a plurality of recesses for defining a plurality of stress-concentration portions, the stress-concentration portions may be designed to have different depths from one another in accordance with a profile of a stress acting on the second portion 42b in order to equalize a stress acting on the stress-concentration portions. As an alternative, the stress-concentration portions may be designed to have a depth smaller than a depth of the recess 45 in order to control concentration of a stress to each of the stress-concentration portions.

Though the recess 45 is U-shaped in the fifth embodiment, the recess 45 may be designed to have an arbitrary shape. For instance, the recess 45 may be triangular or rectangular in shape.

Though the semiconductor device 50 illustrated in FIG. 8 is designed not to include the third portion 12c unlike the first embodiment, the semiconductor device 50 may be designed to include a third portion 42c (illustrated with a broken line) corresponding to the third portion 12c in the first embodiment.

In the fifth embodiment, the stress-concentration portion 44 is defined by forming the recess 45 in the second portion 42b of the shell 42. It should be noted that the stress-concentration portion 44 may be defined by forming a hole inside the second portion 42b or partially reducing a strength of the second portion 42b, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-294608 filed on Sep. 26, 2001 including specification, claims, drawings and summary is incorporated herein by reference in its entirety.

What is claimed is:

1. A semiconductor device for optically coupling a semiconductor light-emitting device to an optical fiber, comprising:
   (a) a lens which focuses lights emitted from said semiconductor light-emitting device, onto said optical fiber;
   (b) a shell which supports said lens therewith, said shell being comprised of a cylindrical first portion, a second portion integral with said first portion at an upper end of said first portion and being formed centrally with an opening into which said lens is to be fit, and a cylindrical third portion extending from said first portion upwardly beyond said second portion;
   (c) glass arranged around said lens for keeping said lens and said opening hermetically sealed; and
   (d) reinforcements formed on upper and lower surfaces of said second portion for preventing said shell from being deformed due to a stress acting on said shell.

2. The semiconductor optically-coupling device as set forth in claim 1, wherein said reinforcements have a shape for covering a stress acting on said second portion therewith when thermal stress acts on said shell.

3. The semiconductor optically-coupling device as set forth in claim 1, wherein said reinforcements have a linearly tapered cross-section.

4. The semiconductor optically-coupling device as set forth in claim 1, wherein said reinforcements have a step-shaped cross-section.

5. The semiconductor optically-coupling device as set forth in claim 1, wherein said reinforcements have an inwardly-projecting arcuate cross-section.

6. A semiconductor device for optically coupling a semiconductor light-emitting device to an optical fiber, comprising:
   (a) a lens which focuses lights emitted from said semiconductor light-emitting device, onto said optical fiber;

(b) a shell which supports said lens therewith, said shell being comprised of a cylindrical first portion, and a second portion integral with said first portion at an upper end of said first portion and being formed centrally with an opening into which said lens is to be fit;

(c) glass arranged around said lens for keeping said lens and said opening hermetically sealed; and (d) reinforcements formed on a lower surface and an upper surface of said second portion for preventing said shell from being deformed due to a stress acting on said shell.

7. The semiconductor optically-coupling device as set forth in claim 6, wherein said reinforcements have a shape for covering a stress acting on said second portion therewith when thermal stress acts on said shell.

8. The semiconductor optically-coupling device as set forth in claim 6, wherein said reinforcements have a linearly tapered cross-section.

9. The semiconductor optically-coupling device as set forth in claim 6, wherein said reinforcements have a step-shaped cross-section.

10. The semiconductor optically-coupling device as set forth in claim 6, wherein said enforcements have an inwardly-projecting arcuate cross-section.

11. A shell for supporting a lens which focuses lights emitted from a semiconductor light-emitting device, onto an optical fiber, said shell being comprised of a cylindrical first portion, a second portion integral with said first portion at an upper end of said first portion and being formed centrally with an opening into which said lens is to be fit, and a cylindrical third portion extending from said first portion upwardly beyond said second portion.

said shell including reinforcements formed on upper and lower surfaces of said second portion for preventing said shell from being deformed due to a stress acting on said shell.

12. The shell as set forth in claim 11, wherein said reinforcements have a shape for covering a stress acting on said second portion therewith when thermal stress acts on said shell.

13. The shell as set forth in claim 11, wherein said reinforcements have a linearly tapered cross-section.

14. The shell as set forth in claim 11, wherein said reinforcements have a step-shaped cross-section.

15. The shell as set forth in claim 11, wherein said reinforcements have an inwardly-projecting arcuate cross-section.

16. A shell for supporting a lens which focuses lights emitted from a semiconductor light-emitting device, onto an optical fiber, said shell being comprised of a cylindrical first portion, and a second portion integral with said first portion at an upper end of said first portion and being formed centrally with an opening into which said lens is to be fit, said shell including reinforcements formed on a lower surface and an upper surface of said second portion for preventing said shell from being deformed due to a stress acting on said shell.

17. The shell as set forth in claim 16, wherein said reinforcements have a shape for covering a stress acting on said second portion therewith when thermal stress acts on said shell.

18. The shell as set forth in claim 16, wherein said reinforcement have a linearly tapered cross-section.

19. The shell as set forth in claim 16, wherein said reinforcements have a step-shaped cross-section.

20. The shell as set forth in claim 16, wherein said reinforcements have an inwardly-projecting arcuate cross-section.

21. A semiconductor laser module including a semiconductor device for optically coupling a semiconductor light-emitting device to an optical fiber, said semiconductor device comprising:

(a) a lens which focuses lights emitted from a semiconductor light-emitting device, onto an optical fiber;

(b) a shell which supports said lens therewith, said shell being comprised of a cylindrical first portion, a second portion integral with said first portion at an upper end of said first portion and being formed centrally with an opening into which said lens is to be fit, and a cylindrical third portion extending front said first portion upwardly beyond said second portion;

(c) glass arranged around said lens for keeping said lens and said opening hermetically sealed; and (d) reinforcements formed on upper and lower surfaces of said second portion for preventing said shell from being deformed due to a stress acting on said shell.

22. A semiconductor laser module including a semiconductor device for optically coupling a semiconductor light-emitting device to an optical fiber, said semiconductor device comprising:

(a) a lens which focuses lights emitted from a semiconductor light-emitting device, onto an optical fiber;

(b) a shell which supports said lens therewith, said shell being comprised of a cylindrical first portion, and a second portion integral with said first portion at an upper end of said first portion and being formed centrally with an opening into which said lens is to be fit;

(c) glass arranged around said lens for keeping said lens and said opening hermetically sealed; and (d) reinforcements formed on a lower surface and an upper surface of said second portion for preventing said shell from being deformed due to a stress acting on said shell.

* * * * *